United States Patent
Cairns et al.

(10) Patent No.: US 8,576,960 B2
(45) Date of Patent: Nov. 5, 2013

(54) METHOD AND APPARATUS FOR EFFICIENT AMLD MATRIX COMPUTATIONS

(75) Inventors: Douglas A. Cairns, Durham, NC (US); Gregory E. Bottomley, Cary, NC (US); Elias Jonsson, Malmo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 656 days.

(21) Appl. No.: 12/628,341

(22) Filed: Dec. 1, 2009

(65) Prior Publication Data

US 2011/0129000 A1 Jun. 2, 2011

(51) Int. Cl.
*H04L 27/06* (2006.01)
*H04L 23/02* (2006.01)

(52) U.S. Cl.
USPC .......................................... 375/341; 375/262

(58) Field of Classification Search
USPC .......... 375/260, 262, 265, 340, 341; 714/794, 714/795
See application file for complete search history.

(56) References Cited

U.S. PATENT DOCUMENTS

2008/0112382 A1* 5/2008 Shim et al. .................... 370/342
2011/0096873 A1* 4/2011 Khayrallah .................... 375/340

OTHER PUBLICATIONS

G. Bottomley, "Block Equalization and Generalized MLSE Arbitration for the HSPA WCDMA Uplink", *Proc. 68th IEEE Vehicular Technology Conf. (VTC2008—Fall)*, pp. 1-5, 2008.
Kang et al.: "Simplified ML detection scheme for MIMO systems", Vehicular Technology Conference, 2004. VTC 2004—Spring. 2004 IEEE 59th Milan, Italy May 17-19, 2004, Piscataway, NJ, USA, IEEE, US, vol. 2, May 17, 2004, pp. 824-827, XPOI0766024, ISBN: 978-0-7803-8255-8.

* cited by examiner

*Primary Examiner* — Young T. Tse

(57) ABSTRACT

The computation of code-specific channel matrices for an Assisted Maximum Likelihood Detection (AMLD) receiver comprises separately computing high rate matrices that change each symbol period, and a low rate matrix that is substantially constant over a plurality of symbol periods. The high and low rate matrices are combined to generate a code-specific channel matrix for each receiver stage. The high rate matrices include scrambling and spreading code information, and the low rate matrices include information on the net channel response and combining weights. The low rate matrices are efficiently computed by a linear convolution in the frequency domain of the net channel response and combining weights (with zero padding to avoid circular convolution), then transforming the convolution to the time domain and extracting matrix elements. Where the combining weights are constant across stages, a common code-specific channel matrix may be computed and used in multiple AMLD receiver stages.

19 Claims, 3 Drawing Sheets

METHOD AND APPARATUS FOR EFFICIENT AMLD MATRIX COMPUTATIONS

TECHNICAL FIELD

The present invention relates generally to wireless communication receivers, and in particular to efficient computation of code-specific channel matrices for an Assisted Maximum Likelihood Detection (AMLD) receiver.

BACKGROUND

As wireless standards evolve, a major ongoing challenge is transmitting more information per unit time over a given bandwidth. Some known and proposed solutions to this problem are to use more codes (CDMA systems), higher order modulation, Multiple-Input, Multiple-Output (MIMO), increase the effective information symbol rate, or some combination of these approaches. As one or more of these approaches are employed, the job of the wireless receiver becomes more difficult. The interference due to Inter-Symbol Interference (ISI) and/or overlapping symbol streams can have a significant impact on receiver performance. Generally, some form of linear processing is employed in commercial products (e.g., linear symbol or chip level equalization for WCDMA) to suppress interference. The linear processing has the advantages that it is (relatively) low complexity and provides generally good performance. However, receiver performance can be improved further through the use of non-linear processing techniques. Such techniques can be thought of as a way to extend coverage and/or improve the area within the cell for which peak data rates may be offered.

One such nonlinear technique called Assisted Maximum Likelihood Detection (AMLD) was recently proposed in U.S. patent application Ser. No. 12/568,026, titled, "A Method and Apparatus for Detecting a Plurality of Symbol Blocks," filed Sep. 28, 2009, and U.S. patent application Ser. No. 12/035,932, titled, "A Method and Apparatus for Symbol Detection via Reduced Complexity Sequence Estimation Processing," filed Feb. 22, 2008, the disclosures of both of which are incorporated herein by reference in their entireties. The AMLD approach is to perform an initial demodulation to identify interesting symbol candidates, followed by constrained Maximum Likelihood Sequence Estimation (MLSE). The initial demodulation can involve a series of stages, giving rise to Multi-Stage Arbitration or Multi-Stage Assistance (MSA). The first stage is typically some form of single user detection where multiple tentative symbol decisions for each user/code/stream are made, independent of other users/codes/streams. These tentative decisions define a possible symbol set across users/codes/streams. At each subsequent equalization stage, a subset of symbol values is kept for further consideration in the next stage. The final MLSE stage searches among the significantly reduced symbol set for the sequence of symbols that best describe the received data. As a result, each stage is fairly simple. However, with proper design, the "best" solution is kept until the last stage. This results in performance comparable to MLSE (i.e., minimal symbol error rate), but with orders of magnitude reduction in complexity. FIG. 1 diagrammatically illustrates the basic concept.

Although the AMLD receiver is orders of magnitude simpler in terms of complexity than a MLSE receiver, it is still considerably more complex than existing linear receivers. One significant contributor to the receiver complexity is the calculation of a code-specific channel matrix $H(0,i)$. This matrix is used for joint detection in the initial receiver stages, as well as for branch metric generation in the constrained MLSE final stage. It relates the decision variables for symbol period 0 (vector $z(0)$) to the symbols for symbol period $i$ (vector $s(i)$), i.e., $$z(0) = \sum_{i=-I}^{I} H(0,i)s(i) + n(0) \qquad (1)$$

where $n(0)$ models noise and other interference.

The form of $H(0,i)$ depends on the wireless standard and the receiver architecture. For the purpose of illustration, a High Speed Downlink Packet Access (HSDPA) system is assumed, employing a despread and combine receiver architecture, although of course the invention is not limited to this embodiment. The User Equipment (UE) has one or more antennas and allocates J fingers per receive antenna. K codes are assigned to the UE and transmitted via a single antenna located at the base station, or Node B. For such a scenario, element $(k_1, k_2)$ of $H(0,i)$ is given by $$H_{k_1 k_2}(0,i) = \qquad (2)$$
$$\sum_{j=0}^{J-1} \sum_{l=0}^{L-1} w_j^H g_l \left(\frac{1}{N}\right) \sum_{m=1-N}^{N-1} C_{k_2,i}^{k_1,0}(m) R_p(d_j - \tau_l + (0-i)NT_c + mT_c)$$

as described in the paper by G. Bottomley, "Block Equalization and Generalized MLSE Arbitration for the HSPA WCDMA Uplink," published in *Proc. 68th IEEE Vehicular Technology Conf.* (VTC2008-Fall), pp. 1-5, the disclosure of which is incorporated herein by reference in its entirety.

In equation (2), $w_j$ is a vector of combining weights corresponding to the $j^{th}$ finger (i.e., one coefficient per receive antenna), $g_l$ is a vector of radio channel coefficients corresponding to the $l^{th}$ channel path (again, one coefficient per receive antenna), $d_j$ is the delay of the $j^{th}$ finger, $\tau_l$ is the delay of the $l^{th}$ channel path, N is the spreading factor for HSDPA, $R_p(\Delta)$ is the convolution of the transmit and receive pulse shaping filters evaluated at $\Delta$, and $C_{k_2,i}^{k_1,0}(m)$ is an aperiodic code crosscorrelation function between code $k_1$, symbol period 0 and code $k_2$, symbol period i. This aperiodic crosscorrelation function is defined as $$C_{k_2,i}^{k_1,0}(m) = \begin{cases} \sum_{n=0}^{N-1-m} c_{k_2,i}(n) c_{k_1,0}^*(n+m), & 0 \le m \le N-1 \\ \sum_{n=0}^{N-1+m} c_{k_2,i}(n-m) c_{k_1,0}^*(n), & 1-N \le m \le 0 \end{cases} \qquad (3)$$

where $c_{k,i}(n)$ represents the $n^{th}$ chip of channelization code k during the $i^{th}$ symbol period.

Note that equation (2) can be re-written in the form $$H_{k_1 k_2}(0,i) = \frac{1}{N} \sum_{m=1-N}^{N-1} C_{k_2,i}^{k_1,0}(m) \sum_{j=0}^{J-1} w_j^H h(d_j - iNT_c + mT_c) \qquad (4)$$

where $h(d_j - iNT_c + mT_c)$ is a vector of net channel coefficients corresponding to the net channel response at delay $d_j - iNT_c +$ $mT_c$. As with $w_j$ and $g_l$, the net channel coefficient vector consists of one coefficient per receive antenna.

For the last stage (MLSD) and no suppression of other-transmitter interference, the processing delays are the path delays and the weights are the medium coefficients (i.e., Rake front-end). For this case, an efficient method for obtaining a coupling matrix R is given in U.S. patent application Ser. No. 11/739,924, titled, "Efficient Computation of a Waveform Correlation Matrix," filed Apr. 25, 2007, the disclosure of which is incorporated herein by reference in its entirety. It can be shown that the submatrices of R would give H(0,i) for this special case. However, there would still be a need for computing H(0, i) for the other stages that do not employ a Rake front-end.

The solution to obtain H(0,i) for such other stages is direct computation of equation (2) or equation (4). This leads to a significant computation load for two reasons. First, H(0,i) must be calculated every time the effective code(s) change, which is each symbol period. Second, each AMLD stage may have a separate set of combining weights leading to unique H(0,i) matrices for each stage, as well as each symbol period. For these reasons, there is a need to reduce the complexity of such calculations in AMLD so that it can be implemented using existing technology.

SUMMARY

According to one or more embodiments disclosed and claimed herein, the computation of one or more code-specific channel matrices for an Assisted Maximum Likelihood Detection (AMLD) receiver comprises separately computing one or more high rate matrices that change each symbol period, and one or more low rate matrices that are substantially constant over a plurality of symbol periods. The high and low rate matrices are combined to generate a code-specific channel matrix for each receiver stage. The high rate matrices include scrambling and spreading code information, and the low rate matrices include information on the net channel response and combining weights. Where the combining weights change at each stage, a per-stage low rate matrix $T_{stage}$ is generated, and a per-stage code-specific channel matrix $H_{stage}(0,i)$ is generated for use at each receiver stage. Where the combining weights are substantially constant over two or more stages, a common low rate matrix T is generated, and a code-specific channel matrix H(0,i) is generated for use at a plurality of receiver stages. The $T_{stage}$, T matrices are efficiently computed by a linear convolution in the frequency domain of the net channel response and combining weights (with zero padding to avoid circular convolution), then transforming the convolution to the time domain and extracting matrix elements.

One embodiment relates to a method of calculating code-specific channel matrices for use in a multi-stage AMLD wireless communication receiver wherein a set of received symbol candidates is successively refined in sequential computational stages. A low rate matrix T that is substantially constant over a plurality of symbol periods is computed. One or more high rate matrices that vary with each symbol are computed. For each symbol period, the high rate matrices are combined with the low rate matrix to generate a code-specific channel matrix for refining the set of symbol candidates at a particular stage of the AMLD receiver.

Another embodiment relates to a multi-stage AMLD wireless communication receiver operative to consider a set of candidate communication symbols and iteratively refine the candidate set by eliminating candidates at one or more stages. The receiver includes a first stage comprising a linear equalizer followed by a single user detector; one or more subsequent stages, each comprising a block linear equalizer followed by a constrained joint detector; and a final stage comprising a Rake front end followed by a sequence detector. A code-specific channel matrix is calculated for use at one or more stages, by computing a low rate matrix T that is substantially constant over a plurality of symbol periods; computing one or more high rate matrices that vary with each symbol; and for each symbol period, combining the high rate matrices with the low rate matrix to generate a code-specific channel matrix for refining the set of symbol candidates at a particular stage of the AMLD receiver.

DETAILED DESCRIPTION

There are two, related, inventive concepts to the efficient computation of code specific channel matrices so as to reduce the computation burden of the AMLD receiver. First, equations (2) and (4) may be reformulated in terms of quantities that change at the symbol rate, and quantities that change at multiples of the symbol rate. In general, we can write H(0,i) as $$H(0,i) = C_0^H T C_i \qquad (5)$$

Here, $C_i$ is a matrix that changes every symbol period and contains the scrambled spreading codes for symbol period i. On the other hand, T is a matrix that is constant for many symbol periods, and hence may be used across multiple stages of the AMLD receiver. It incorporates information about the transmit and receive pulse shape filters, the radio channel, and the combining weights.

The second inventive concept is an efficient method for obtaining T. These two concepts are combined herein to provide an efficient calculation mechanism for the code specific channel matrix H(0,i). This makes AMLD computationally tractable, and able to be implemented using available hardware.

Figure 1:
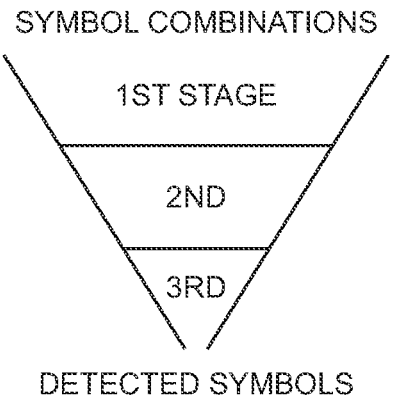
FIG. 1 is a diagrammatic depiction of a multi-stage, Assisted Maximum Likelihood Detection (AMLD) approach to symbol detection.
Figure 2:
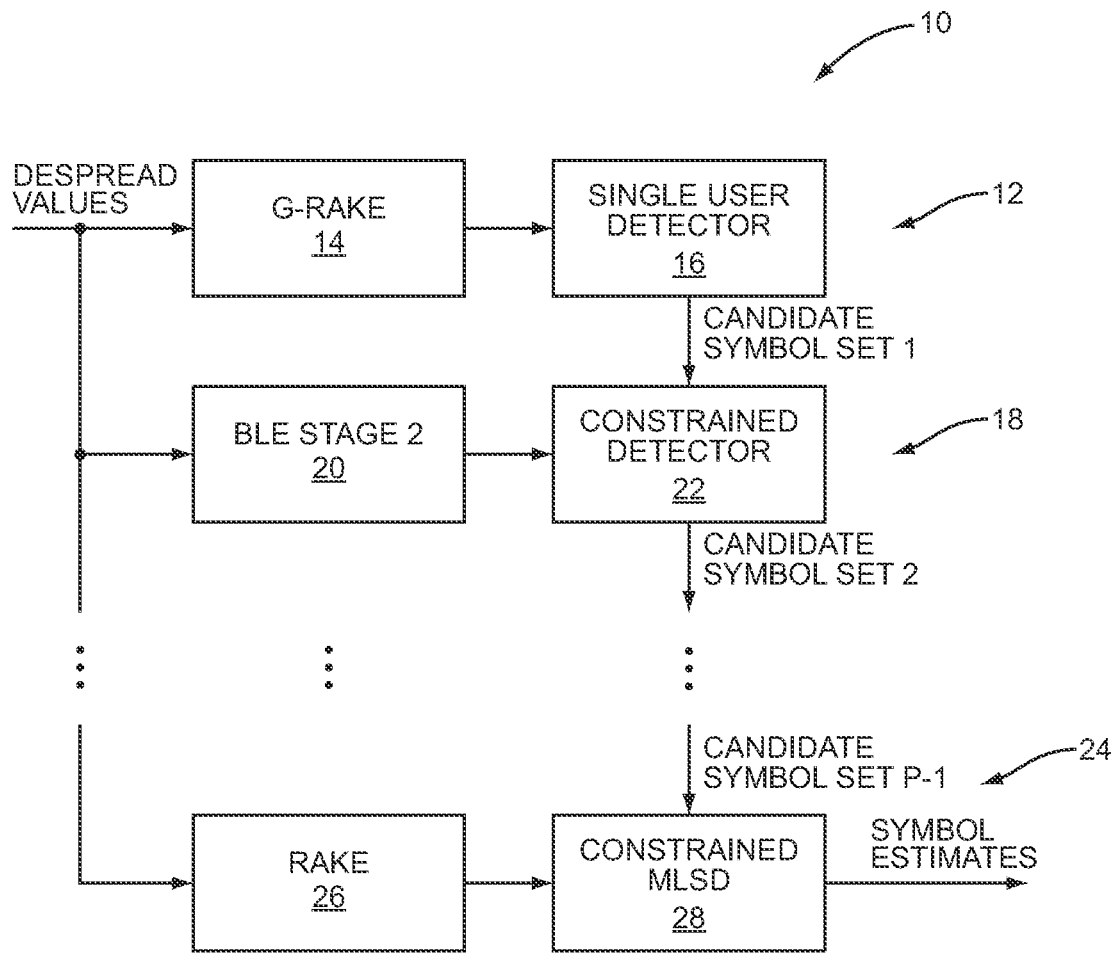
FIG. 2 is a functional block diagram of one embodiment of an AMLD receiver architecture.

Although the present invention is applicable to a wide variety of wireless standards, it is described herein with reference to the WCDMA downlink, as the most severe constraints on receiver computational power exist in mobile, battery-powered UEs. In particular, embodiments of the invention are described herein with reference to the multi-stage architecture depicted in FIG. 2, which depicts a P-stage receiver 10. The first stage 12 comprises linear equalization, such as symbol or chip level equalization 14, followed by a single user detector 16 (i.e., there are no joint symbol decisions at this stage). A subsequent stage 18 comprises a block linear equalizer 20 followed by a constrained detector 22 that jointly detects symbols. A number of stages similar to the second stage 18 may follow. These single user and block linear equalizers are assumed to be time invariant. The last stage 24 comprises a Rake front end 26 and a sequence detector 28. The detector 28 is constrained to consider only symbol combinations generated by the previous stage.

In application Ser. No. 11/739,924 cited above, the elements of coupling matrix R are expressed as a double summation over spreading code indices of spreading code values, medium response values, and pulse shape autocorrelation values. This double summation can be written compactly in matrix form as $$R = C^H BC \quad (6)$$

To consider the case in which the receiver front-end is not a Rake receiver, some notation is established. The transmitted signal of interest can be expressed as $$x(t) = \sum_{k=0}^{K-1} A_k \sum_i s_k(i) \sum_{n=0}^{N-1} c_{k,i}(n) p(t - nT_c - iNT_c) \quad (7)$$

where k is a code index, i is a symbol period index, n is a transmit chip period index, $A_k$ is the code amplitude (square root of code power), N is the spreading factor, K is the number of codes in the group of codes being jointly detected, and $T_c$ is the chip period. For ease of explanation we will assume all codes have the same amplitude A.

The received vector (element per receive antenna) in the absence of noise can be expressed as $$r(t) = \sum_{l=0}^{L-1} g_l x(t - \tau_l) \quad (8)$$

where L is the number of path delays, $g_l$ and $\tau_l$ are the path coefficients and delays, respectively. In practice, these would be estimated. The received signal is processed by a receive filter matched to chip pulse shape (p(t)) and sampled, giving a vector sequence e(m). The resulting signal is either filtered then despread (chip-level equalizer) or despread then combined (symbol-level equalizer). As the result is equivalent, a chip-level equalizer is assumed for explanation.

Consider demodulation of symbol period 0. First N chip estimates would be formed using $$v(m) = \sum_{j=0}^{J-1} w_j^H e(m + d_j), \quad (9)$$

$$m = 0 \ldots N - 1$$

where J is the number of processing delays (number of equalizer taps) used, $d_j$ is a processing delay, and $w_j$ is the vector of combining weights. These chip estimates are then despread using the spreading codes (multiply by conjugate and sum).

Using this notation, equation (2) may be written in an equivalent form as $$H(0,i) = C_0^H A W^H Q_i C_i \quad (10)$$

where $N_a$ is the number of receive antennas;
K is the number of codes in a group for group detection;
C(i) is a N×K matrix whose columns are the spreading codes for symbol period i;
W is a $JN_a \times N$ matrix with columns consisting of stacked vectors associated with different processing delays ($w_j$); and $Q_i$ is a $JN_a \times N$ matrix made up of $N_a \times 1$ submatrices that depend on the path coefficients ($g_l$), path delays ($\tau_l$), processing delays ($d_j$) and the chip pulse shape autocorrelation function ($R_p(t)$); specifically, the fth super row ($N_a$ rows in a super row) and mth column are given by $$[g_0 \cdots g_{L-1}] \begin{bmatrix} R_p(d_j - mT_c - iNT_c - \tau_0) \\ \vdots \\ R_p(d_j - mT_c - iNT_c - \tau_{L-1}) \end{bmatrix}$$

Equation (4) can also be written in the matrix form shown in equation (10). However, in that case the definition of $Q_i$ changes to:

$Q_i$ is a $JN_a \times N$ matrix made up of $N_a \times 1$ submatrices. The fth super row and mth column are given by $h(d_j - iNT_c + mT_c)$.

Although H(0,i) varies symbol by symbol, some matrices in equation (10) are constant over multiple symbol periods. The computations may thus be partitioned into a slow rate set and a high rate set. The slow rate set consists of the convolution of the combining weights with the net channel response ($AW^H Q_i$). The high rate set consists of the despreading/spreading operations ($C_0, C_i$). The low rate set of computations need only be performed once for the symbol periods where the quantities are approximately constant. The high rate set of computations must be performed for each symbol period.

Since the low rate computation set involves linear convolutions, these can be efficiently performed using FFTs. Conceptually, these convolutions and the construction of the T matrix are performed as follows:

1. compute FFT of combining weights→W(ω).
2. compute FFT of net channel response→H(ω).
3. compute T(ω)=W·(ω)H(ω).
4. compute IFFT of T(ω) to obtain $T(nT_s)$.
5. select appropriate samples of $T(nT_s)$ and multiply by A to form $T = AW^H Q$.

The FFT computations in steps 1 and 2 above require zero padding; otherwise, step 3 implements circular convolution instead of linear convolution. Additionally, the procedure above is strictly correct only if the equalizer taps/fingers are spaced by integer multiples of the chip period. For non-integer spacings, the procedure must be modified as described in U.S. patent application Ser. No. 11/479,483, titled, "Method and Apparatus for Interference Estimation in a Generalized Rake Receiver," filed Jun. 30, 2006, the disclosure of which is incorporated herein by reference in its entirety. Finally, the steps above assume the net channel coefficient formulation based on equation (4). An alternate formulation based on equation (2) is also feasible.

Figure 3:
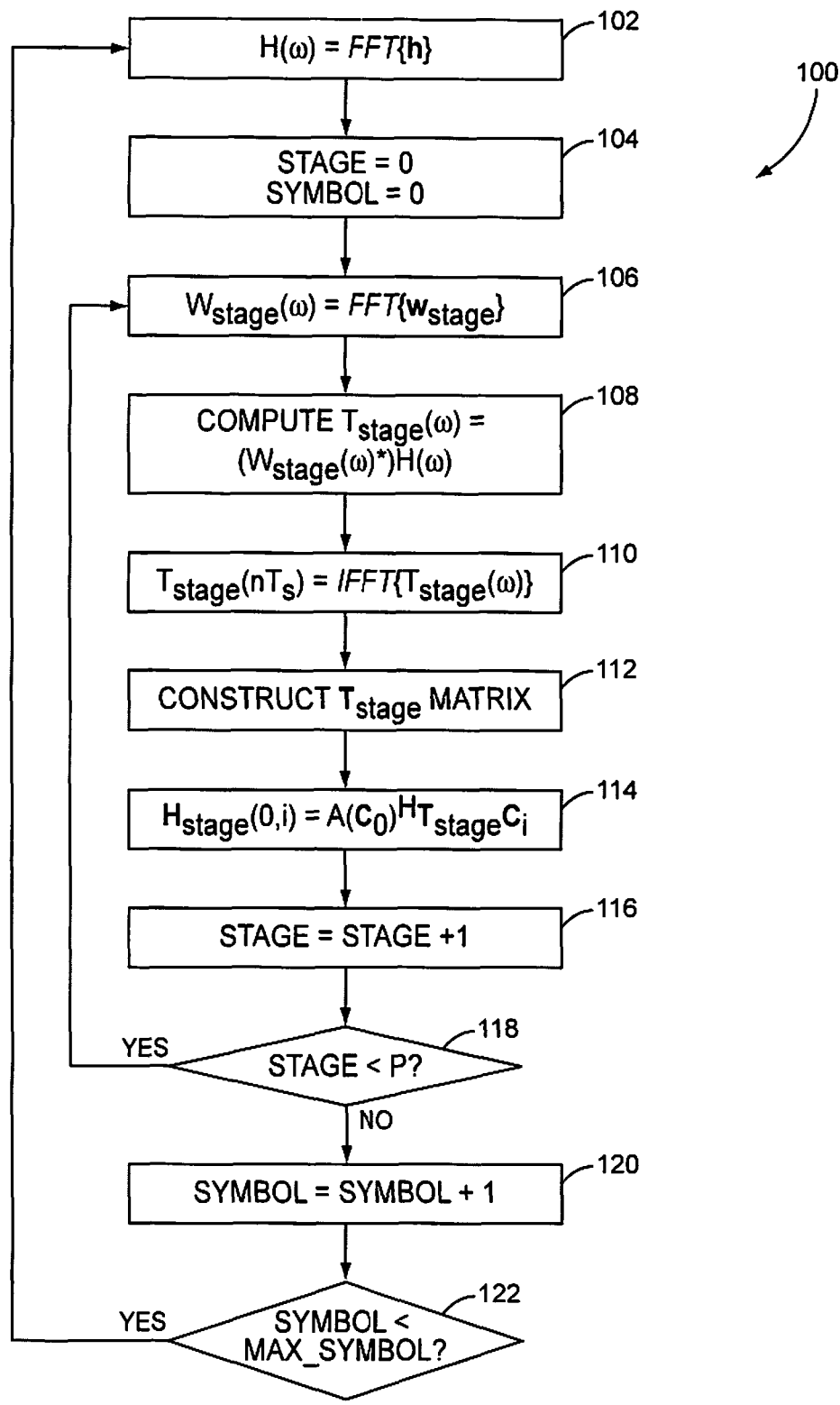
FIG. 3 is a flow diagram of a general time-invariant equalization method of calculating per-stage, code-specific channel matrices for an AMLD receiver.

A general time-invariant equalization embodiment is explained with reference to a WCDMA receiver, where the net channel and combining weights are updated on a slot basis (i.e., $W_{stage}$ is different for each AMLD receiver stage). Of course, the present invention is not limited to this application. FIG. 3 depicts a method 100 of calculating a per-stage, code-specific channel matrix $H_{stage}(0,i)$ under the above assumptions.

For each new slot, the frequency domain net channel response H(ω) is calculated (block 102) by computing the channel coefficients h and then transforming h to the frequency domain using FFT. For each new symbol and for each AMLD receiver stage (initialized at block 104), the frequency domain combining weights $W_{stage}(\omega)$ are calculated (block

106) by computing the time domain combining weights $w_{stage}$ and stage transforming $w_{stage}$ to the frequency domain using FFT.

The frequency domain representation of matrix $T_{stage}(\omega)$, that is substantially constant over a plurality of symbol periods, is then computed as $T_{stage}(\omega)=W^*_{stage}(\omega)H(\omega)$ (block 108). The frequency domain representation $T_{stage}(\omega)$ is then transformed to the time domain $T_{stage}(nT_s)$ using an IFFT (block 110). A per-stage low rate matrix $T_{stage}$ is then constructed by selecting elements from $T(nT_s)$ (block 112).

The per-stage low rate matrix $T_{stage}$, which is substantially constant over a plurality of symbol periods, is then combined with second matrices $C_0$ and $C_i$ and scaled by the code power A. This generates the code-specific channel matrix for the current stage, $H_{stage}(0,i)$, as $H_{stage}(0,i)=AC_0^H T_{stage}C_i$ (block 114).

Applying equation (1), using the code-specific channel matrix for the current stage, $H_{stage}(0,i)$, the set of symbols being considered by the AMLD receiver is refined, and if successive processing stages remain (blocks 116 and 118), the low rate matrix $T_{stage}$ is computed for the next stage (blocks 106-112), and a code-specific channel matrix $H_{stage}(0,i)$ is computed (block 114) to further refine the candidate symbol set. For the next symbol (blocks 120 and 122), the process is repeated.

The code-specific channel matrix $H_{stage}(0,i)$ computed according to the method 100 yields a unique code-specific channel matrix per receiver stage. This is a consequence of unique combining weights per stage. The per-stage, code-specific channel matrix $H_{stage}(0,i)$ contains entries for all combinations of K channelization codes. If the BLE for a particular stage requires a subset of codes, the corresponding subset of the matrix may be extracted. Note that matrix $T_{stage}$ is Toeplitz (i.e., all elements on a given diagonal are equivalent). Therefore, in block 112, there are only $(2(N-1)+1)$ unique matrix elements that need to be extracted to fully construct $T_{stage}$.

Figure 4:
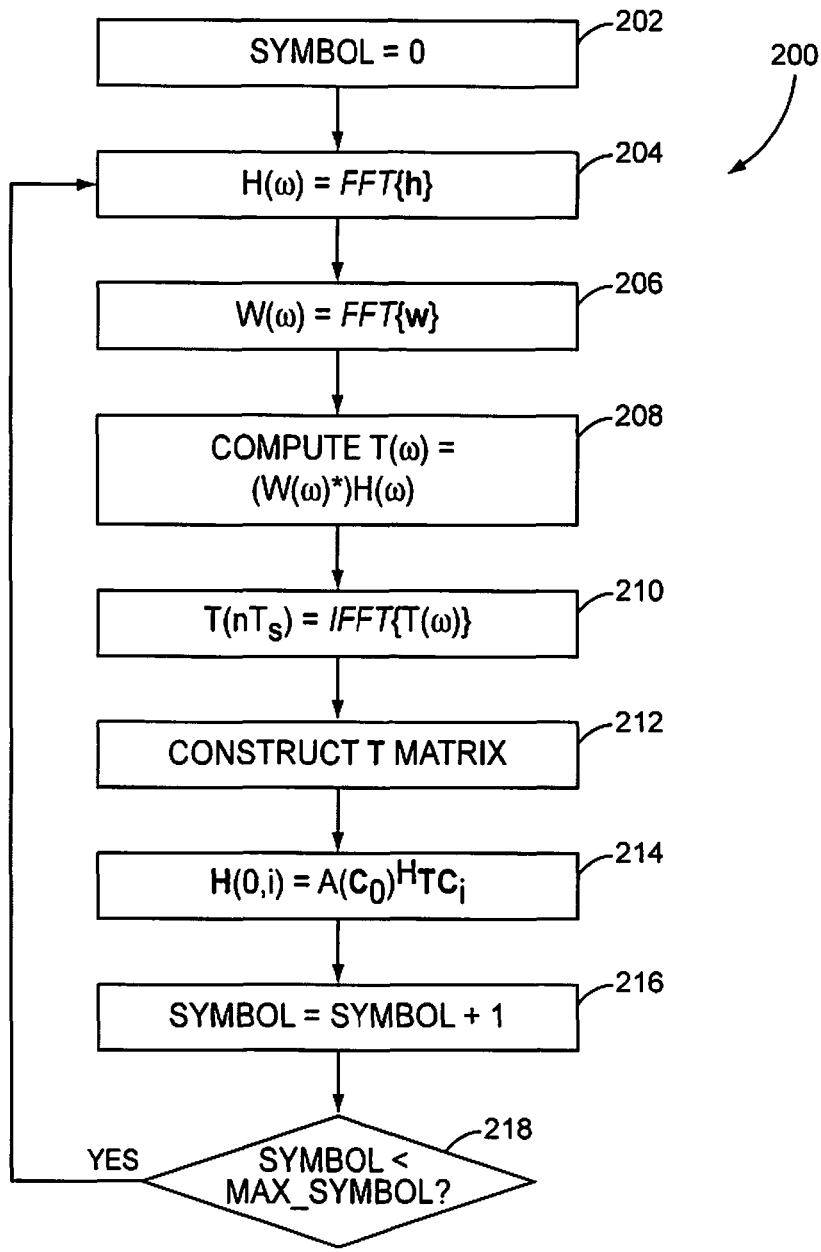
FIG. 4 is a flow diagram of a simplified time-invariant equalization method of calculating a code-specific channel matrix applicable across stages of an AMLD receiver.

A simplification to the method 100 of the embodiment of FIG. 3 is to assume that the combining weights are identical for every stage. A common set of combining weights means that the slowly varying portion of H(0,i) is identical for all stages (i.e., $T_{stage}$ from blocks 108-112 of method 100 becomes T and is not stage-specific). Therefore it only needs to be computed once and can be reused across stages. FIG. 4 depicts, in a simplified time-invariant equalization embodiment, a method 200 of efficiently calculating a code-specific channel matrix H(0,i), assuming a WCDMA receiver where the radio channel and combining weights are updated on a slot basis, but wherein the combining weights are common across stages.

First, a symbol count is initialized (block 202). For each new slot, the frequency domain net channel response $H(\omega)$ is calculated (block 204) by computing the channel coefficients h and then transforming h to the frequency domain using FFT. The frequency domain combining weights $W(\omega)$ are calculated (block 206) by computing the common time domain combining weights w and transforming w to the frequency domain using FFT.

The frequency domain representation of matrix $T(\omega)$, that is substantially constant over a plurality of symbol periods, is then computed as $T(\omega)=W^*(\omega)H(\omega)$ (block 208). The frequency domain representation $T(\omega)$ is then transformed to the time domain $T(nT_s)$ using an IFFT (block 210). A low rate matrix T is then constructed by selecting elements from $T(nT_s)$ (block 212).

The low rate matrix T, which is substantially constant over a plurality of symbol periods, is then combined with second matrices $C_0$ and $C_i$ and scaled by the code power A. This generates the code-specific channel matrix, H(0,i), as $H(0,i)=AC_0^H T C_i$ (block 214).

Applying equation (1), using the code-specific channel matrix, H(0,i), the set of symbols being considered by the AMLD receiver is refined. Since H(0,i) is not stage specific, this same process repeats for a plurality of stages (not shown in FIG. 4). For the next symbol (blocks 216, 218), the process is repeated.

The code-specific channel matrix H(0,i) computed according to the method 200 contains entries for all combinations of K channelization codes for all AMLD receiver stages. If the BLE for a particular stage requires a subset of codes, the corresponding subset of the matrix may be extracted. Note that the low rate matrix T is Toeplitz (i.e., all elements on a given diagonal are equivalent). Therefore, in block 212, there are only $(2(N-1)+1)$ unique matrix elements that need to be extracted to fully construct T.

For explanation of a general time-variant equalization embodiment, as in the case of time invariant equalization, a WCDMA receiver is considered where the net channel and combining weights are updated on a slot basis, but the combining weights are stage-specific. The definition of the weight matrix for time-varying equalization changes to:

W is a $JN_a \times N$ matrix with columns associated with different estimated chips, each column consisting of stacked vectors associated with different processing delays (w The frequency domain approach does not yield any efficiency advantage here, so a straightforward time-domain implementation is considered. The general approach is to compute $T_{stage}=AW^H Q_i$ once per slot. This result may be stored and used to generate $H_{stage}(0,i)=AC_0^H T_{stage}C_i$ on a symbol-by-symbol basis. This embodiment may be simplified in a similar fashion to the simplified time-invariant embodiment of FIG. 4 (i.e., method 200) if the combining weight matrix is assumed to be the same for all equalization stages.

According to embodiments of the present invention, the computation burden of an AMLD receiver is significantly reduced. Additionally, receivers will likely need to support both HSPA and LTE for the foreseeable future. Through frequency domain processing, embodiments of the present invention reuse available LTE FFT/IFFT hardware when the receiver processes HSPA signals.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of calculating code-specific channel matrices for use in a multi-stage Assisted Maximum Likelihood Detection (AMLD) wireless communication receiver wherein candidate symbol sets are successively refined in sequential computational stages, comprising:

calculating a code-specific channel matrix for use at one or more stages by computing a low rate matrix T that is substantially constant over a plurality of symbol periods;

computing high rate matrices that vary with each received candidate symbol; and for each symbol period, combining the high rate matrices with the low rate matrix T to generate the code-specific channel matrix for refining a candidate symbol set at a particular stage of the AMLD receiver.

2. The method of claim 1 wherein a high rate matrix C includes composite of scrambling and spreading codes for each symbol period.

3. The method of claim 1 wherein the low rate matrix T includes information on a net channel response and combining weights.

4. The method of claim 3 wherein the combining weights change with each AMLD receiver stage, and the low rate matrix T is computed as $T_{stage}$ for each AMLD receiver stage.

5. A method of calculating code-specific channel matrices for use in a multi-stage Assisted Maximum Likelihood Detection (AMLD) wireless communication receiver wherein a candidate symbol sets are successively refined in sequential computational stages, comprising:
calculating a code-specific channel matrix for use at one or more stages by computing a low rate matrix T that is substantially constant over a plurality of symbol periods, wherein the low rate matrix T includes information on a net channel response and combining weights, wherein the combining weights are substantially constant over two or more AMLD receiver stages, and the low rate matrix T is computed once and used in two or more AMLD receiver stages;
computing high rate matrices that vary with each received candidate symbol; and
for each symbol period, combining the high rate matrices with the low rate matrix to generate the code-specific channel matrix for refining a candidate symbol set at a particular stage of the AMLD receiver.

6. A method of calculating code-specific channel matrices for use in a multi-stage Assisted Maximum Likelihood Detection (AMLD) wireless communication receiver wherein candidate symbol sets are successively refined in sequential computational stages, comprising:
calculating a code-specific channel matrix for use at one or more stages by computing a low rate matrix T that is substantially constant over a plurality of symbol periods and combining weights, wherein computing the low rate matrix T comprises:
transforming the combining weights, a time domain quantity, to frequency domain;
transforming a net channel response, a time domain quantity, to frequency domain;
computing a linear convolution in the frequency domain of the combining weights and the frequency domain of the net channel response to form a low rate frequency domain matrix;
transforming the low rate frequency domain matrix to a low rate time domain matrix; and
selecting elements from the low rate time domain matrix to form the low rate matrix T;
computing high rate matrices that vary with each received candidate symbol; and
for each symbol period, combining the high rate matrices with the low rate matrix T to generate the code-specific channel matrix for refining a candidate symbol set at a particular stage of the AMLD receiver.

7. The method of claim 6 wherein transforming the combining weights to the frequency domain comprises performing a Fast Fourier Transform (FFT), and wherein transforming the net channel response to the frequency domain comprises performing a Fast Fourier Transform (FFT).

8. The method of claim 6, wherein transforming the combining weights to the frequency domain comprises performing a Fast Fourier Transform (FFT), wherein transforming the net channel response to the frequency domain comprises performing a Fast Fourier Transform (FFT) and wherein performing the FFTs include zero padding to avoid circular convolution.

9. The method of claim 6 wherein the low rate matrix T is a Toeplitz matrix having constant diagonal elements.

10. The method of claim 9 wherein selecting the elements from the low rate time domain matrix to form the low rate matrix T comprises selecting at most $(2(N-1)+1)$ unique matrix elements to form the low rate matrix T, where N is a spreading factor.

11. A multi-stage Assisted Maximum Likelihood Detection (AMLD) wireless communication receiver operative to consider received candidate symbols and iteratively refine received candidate symbol sets by eliminating candidates at one or more stages, comprising:
a first stage comprising a linear equalizer followed by a single user detector;
subsequent intermediate stages, each comprising a block linear equalizer followed by a constrained joint detector; and
a final stage comprising a Rake front end followed by a sequence detector;
wherein a code-specific channel matrix is calculated for use at the one or more stages, by
computing a low rate matrix T that is substantially constant over a plurality of symbol periods;
computing high rate matrices that vary with each received candidate symbol; and
for each symbol period, combining the high rate matrices with the low rate matrix T to generate the code-specific channel matrix for refining the received candidate symbol sets at a particular stage of the AMLD receiver.

12. The receiver of claim 11 wherein the linear equalizer of the first stage performs Generalized Rake equalization.

13. The receiver of claim 11 wherein the linear equalizer of the first stage performs chip equalization equalization.

14. The receiver of claim 11 wherein the block linear equalizer and the single user detector are time invariant.

15. The receiver of claim 11 wherein a high rate matrix C includes composite of scrambling and spreading codes for each symbol period.

16. The receiver of claim 11 wherein the low rate matrix T includes information on a net channel response and combining weights.

17. The receiver of claim 16 wherein the combining weights change with each AMLD receiver stage, and the low rate matrix T is computed as $T_{stage}$ for each AMLD receiver stage.

18. The receiver of claim 16 wherein the combining weights are substantially constant over two or more AMLD receiver stages, and the low rate matrix T is computed once and used in the two or more AMLD receiver stages.

19. The receiver of claim 16 wherein computing the low rate matrix T comprises:
transforming the combining weights to frequency domain;
transforming the net channel response, a time domain quantity, to frequency domain;
computing a linear convolution, a time domain quantity, to the frequency domain of the combining weights and the frequency domain of the net channel response to form a low rate frequency domain matrix;
transforming the low rate frequency domain matrix to a low rate time domain matrix; and
selecting elements from the low rate time domain matrix to form the low rate matrix T.

* * * * *

UNITED STATES PATENT AND TRADEMARK OFFICE
CERTIFICATE OF CORRECTION

PATENT NO. : 8,576,960 B2
APPLICATION NO. : 12/628341
DATED : November 5, 2013
INVENTOR(S) : Cairns et al.

Page 1 of 1

It is certified that error appears in the above-identified patent and that said Letters Patent is hereby corrected as shown below:

Title Page, Item (73), under "Assignee", in Column 1, Line 2, delete "Stockolm" and insert -- Stockholm --, therefor.

In the Specification

In Column 2, Line 43, delete " $C_{k_2,i}^{k_1,0}(m)$," and insert -- $C_{k_2,i}^{k_1,0}(m)$ --, therefor.

In Column 2, Line 67, delete "$d_1$-$iNT_c$+" and insert -- $d_j$-$iNT_c$+ --, therefor.

In Column 6, Line 4, delete "the fth" and insert -- the jth --, therefor.

In Column 6, Line 16, delete "The fth" and insert -- The jth --, therefor.

In Column 8, Line 27, delete "(w" and insert -- ($w_{j,m}$). --, therefor.

In Column 8, Lines 27-36, delete "The frequency..........stages." and insert the same at Line 28, as a new paragraph.

In the Claims

In Column 9, Line 12, in Claim 5, delete "wherein a" and insert -- wherein --, therefor.

In Column 10, Line 1, in Claim 8, delete "(FFT) and" and insert -- (FFT), and --, therefor.

In Column 10, Line 36, in Claim 13, delete "equalization equalization." and insert -- equalization. --, therefor.

Signed and Sealed this
Twenty-ninth Day of April, 2014

Michelle K. Lee
*Deputy Director of the United States Patent and Trademark Office*